United States Patent [19]
Ostman

[11] Patent Number: 5,590,160
[45] Date of Patent: Dec. 31, 1996

[54] SYMBOL AND FRAME SYNCHRONIZATION IN BOTH A TDMA SYSTEM AND A CDMA

[75] Inventor: Kjell Ostman, Salo, Finland

[73] Assignee: Nokia Mobile Phones Ltd., Salo, Finland

[21] Appl. No.: 387,031

[22] Filed: Feb. 10, 1995

Related U.S. Application Data

[63] Continuation-in-part of Ser. No. 998,903, Dec. 30, 1992, Pat. No. 5,408,504.

[51] Int. Cl.$^6$ .............................. H04L 7/02; H04L 27/30
[52] U.S. Cl. ...................... 375/367; 375/209; 375/210; 370/342; 370/515
[58] Field of Search ............................ 375/205, 208–210, 375/343, 367; 370/107, 18; 327/164

[56] References Cited

U.S. PATENT DOCUMENTS

| | | | |
|---|---|---|---|
| 4,279,018 | 7/1981 | Carson | 375/208 |
| 4,692,931 | 9/1987 | Ohsawa | 375/355 |
| 4,805,191 | 2/1989 | Burch et al. | 375/229 |
| 4,847,880 | 7/1989 | Kamerman et al. | 375/222 |
| 4,975,927 | 12/1990 | Yoshida | 375/235 |
| 4,984,247 | 1/1991 | Kaufmann et al. | 375/200 |
| 5,101,417 | 3/1992 | Richley et al. | 370/18 |
| 5,315,615 | 5/1994 | DeLisle et al. | 375/205 |
| 5,329,558 | 7/1994 | Larsson et al. | 375/365 |
| 5,341,395 | 8/1994 | Bi | 375/205 |

FOREIGN PATENT DOCUMENTS

| | | |
|---|---|---|
| 0431957A2 | 6/1991 | European Pat. Off. . |
| 4212194A1 | 10/1992 | Germany . |
| WO9117613 | 11/1991 | WIPO . |

OTHER PUBLICATIONS

European Search Report dated 25 Nov. 1994 in Vienna.
"Introduction To CDMA and the Proposed Common Air Interface Specification (CAI) For A Spread Spectrum Digital Cellular Standard" Mar. 28, 1992 Qualcomm Inc, No. EX60–10010 pp. 1–58.

Primary Examiner—Young T. Tse
Attorney, Agent, or Firm—Perman & Green

[57] ABSTRACT

A digital radio communication system includes a receiver for receiving a signal stream that includes data frames, each frame including a data signal sequence and a synchronizing signal sequence. The communication system synchronizes the receiver by employing the signal stream. The receiver comprises: a sampling circuit for sampling symbol levels in the synchronizing signal sequence; cross correlation circuitry for comparing values derived from the sampled symbol levels with an expected set of values and producing an error value output; and correction circuitry that is responsive to the error output and produces a sample control output to the sample circuitry to alter the times of sampling of the symbol levels so as to reduce the error output and achieve time synchronization with the received synchronizing signal sequence. A further embodiment of the invention is described in relation to a CDMA receiving system.

7 Claims, 9 Drawing Sheets

PARTIAL AUTO CORRELATION

PRIOR ART

SYMBOL AND FRAME SYNCHRONIZATION IN BOTH A TDMA SYSTEM AND A CDMA

This Patent Application is a continuation-in-part of U.S. patent application Ser. No. 07/998,903 entitled "Symbol and Frame Synchronization In A TDMA System" filed Dec. 30, 1992, now U.S. Pat. No. 5,408,504.

FIELD OF THE INVENTION

This invention relates to digital data transmission and reception systems, and more particularly, to apparatus for achieving synchronization in a multi-path propagation environment.

BACKGROUND OF THE INVENTION

TDMA SYSTEMS

Many digital radio transmission systems transmit data frames that comprise interspersed data and synchronization sequences. Cellular telephone systems employ such TDMA protocols and are an example of a system in which the invention hereof may be employed. Each receiving station has an assigned synchronization sequence that enables the station to selectively decode accompanying data. Such synchronization sequences are utilized in time division multiple access (TDMA) systems wherein separate users are allocated separate time slots of a same frequency bandwidth. Each time slot is accompanied by a synchronization sequence that is known to a receiving station and enables that receiving station to achieve synchronization with the transmitted signal.

Often a synchronization sequence is chosen so that it exhibits a zero autocorrelation characteristic. More specifically, if such a synchronization sequence is correlated with itself, only when the sequences being correlated are aligned does the correlator generate a pulse output. At other times, the correlator's output is zero or nearly zero. A synchronization sequence exhibiting a zero autocorrelation characteristic allows an impulse response of a channel to be estimated and enables synchronization actions to occur.

Figure 1A:
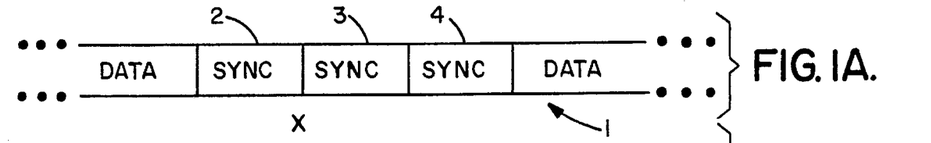
FIGS. 1a–1c illustrate the use of a periodic synchronization sequence (FIG. 1a), the generation of its autocorrelation function (FIG. 1b) and the resulting autocorrelation function (FIG. 1c).
Figure 1B:
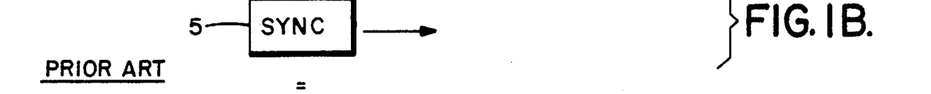
Figure 1C:
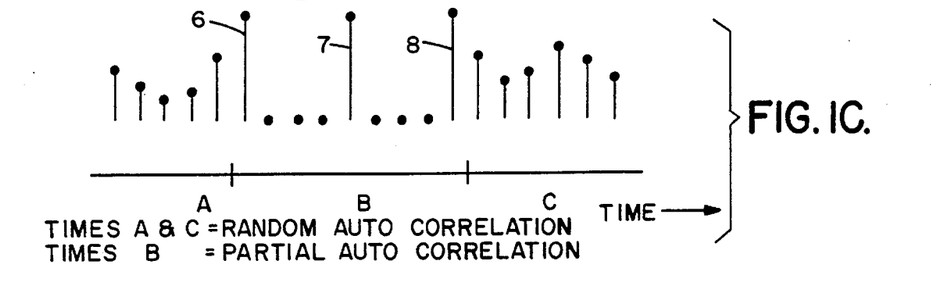

In FIG. 1, a TDMA signal train 1 indicates three identical synchronization sequences 2, 3 and 4 interspersed between a pair of data time slots. A receiver stores a copy 5 of the synchronizing sequence and causes it to be sequentially compared to the received sequences 2, 3 and 4 during autocorrelation. Only when copy 5 is perfectly aligned with a synchronizing sequence 2, 3 and 4 does an autocorrelator produce a pulse output (e.g. pulses 6, 7 and 8, respectively). Since pulse output 7 is isolated by adjacent zero outputs (due to the zero autocorrelation characteristics of the synchronizing sequence), pulse 7 can be easily isolated and used to commence a frame synchronization operation.

Figure 2:
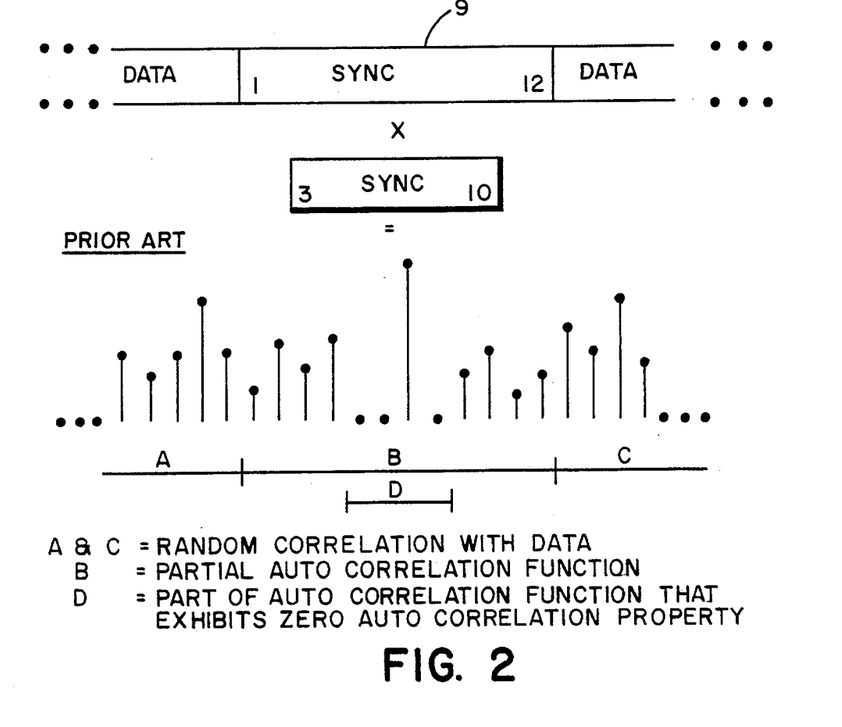
FIG. 2 illustrates the use of a synchronization sequence having partial zero autocorrelation and the resulting autocorrelation function.

In FIG. 2, only a single synchronizing sequence 9 is transmitted. A partial autocorrelation can be accomplished by using only a subset of the synchronizing sequence (e.g. bits 3–10 when a synchronizing sequence 9 comprises bits 1–12). During times A and C, the subset shows a random correlation with incoming data. During time B a partial autocorrelation function is exhibited, and during time D, a zero autocorrelation property is exhibited.

Figure 3:
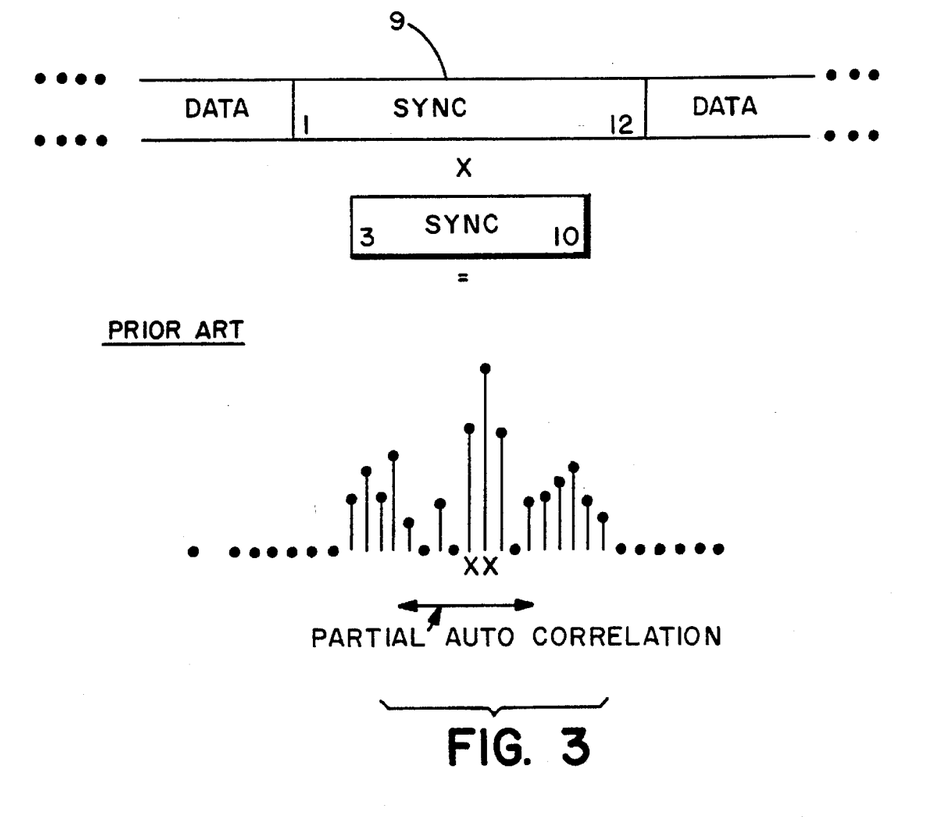
FIG. 3 illustrates the resulting autocorrelation function when the autocorrelation function is calculated using two intervals per signaling symbol.

In FIGS. 1 and 2, a symbol sample rate of once per symbol is assumed. Under such circumstances, frame synchronization, plus or minus one symbol time, can be achieved. In FIG. 3, an autocorrelation function is shown that is achieved when the sample rate is performed at twice the symbol rate. Such a partial autocorrelation takes the approximate form of the impulse response of the channel.

Cellular telephone systems often suffer from multipath propagation effects, where a receiver sees copies of a transmitted signal that have traveled different paths between the transmitter and the receiver. Generally such paths are of different lengths and cause these copies of the transmitted signals to be delayed relative to each other. If the signalling rates in such systems are sufficiently high, multipath propagation causes intersymbol interference which, in turn, makes signal detection impossible.

The term symbol is used in this context to refer to transmitted signals that are phase modulated with discrete phase relationships, each assigned phase relationship being a symbol that is subject to detection at a receiver. The term intersymbol interference refers to two or more symbols that are superimposed upon each other, phase detection of each symbol thus becoming extremely difficult, if not impossible.

Systems for modulating the phase of a carrier wave to represent digital binary data are known in the prior art. A four state modulator (quaternary phase shift keying or QPSK) enables a carrier wave to take four different phase values depending on values assumed by successive two-bit binary groups. Each of the four equi-spaced phases is separated by 90°.

Generally, if no pilot synchronization signal is generated by the transmitter, the receiver must derive symbol timing from the received signal. Both the transmitter and receiver employ separate station clocks which drift, relative to each other, and any symbol synchronization technique must be able to track such drift. Furthermore, in the case of intersymbol interference as a result of multi-path propagation, many receivers employ equalization techniques to enable differentiation of multi-path received signals. If the received signal is to be detected without aid of an equalization procedure, the time of sampling of the received signal must be optimally chosen. If equalization is used, the method chosen must be able to operate over a time span at least as long as the delay between the signal paths. However, the longer the time span of the equalizing method, the more computation power is required. To minimize the required computation power, the equalizing method needs to be optimally aligned to the incoming signal. The problem is further complicated by the fact that where one of the communicating stations is mobile, the multi-path propagation phenomena is accompanied by signal jitter during the reception window.

CDMA SYSTEMS

Code-division multiple access (CDMA) communications is a multiple access scheme based on spread spectrum communications. In a CDMA system, each signal consists of a different pseudo random binary sequence that modulates a carrier, spreading the spectrum of the signal. A large number of CDMA signals share the same frequency spectrum. Signals are separated in a receiver by using a correlator which accepts only signal energy from a selected sequence and despreads its spectrum. Other users' signals, whose codes do not match, are not despread in bandwidth and, as a result, contribute only to the noise and represent a self interference generated by the system. The spreading signal or pseudo random noise (PN) signal comprises a series of bits that are referred to in the art as "chips". The chips or chip sequences that are used to modulate the data signal are identical at the sending and receiving stations. In general, chip sequences exhibit a much higher frequency than an input voice or data signal and, as a result, there are a plurality of chips generated for every signal information bit.

For proper operation, after a received carrier signal has been demodulated, a PN signal generator in the receiver is synchronized to the incoming PN signal sequence. A primary function of the synchronization action is to despread the received PN signal so as to enable demodulation of the received data signal. This is accomplished by generating a local replica of the PN signal sequence and then synchronizing the local PN sequence to the PN sequence which modulates the incoming data signal. The process of synchronization is conventionally accomplished in two steps. The first step, referred to as acquisition, brings the two spreading signals into alignment with one another. The second step, referred to as tracking, continuously maintains a best possible waveform alignment by means of feedback control.

Because a receiver's clock signal may drift, it is difficult to maintain precise phase alignment with an incoming PN sequence. This is made more difficult by the phenomena of multipath propagation wherein the same signal may take plural pathways and arrive at the receiver at multiple, slightly different times. To accommodate such multipath propagation, "rake" receivers are provided and include plural "fingers", each finger having applied to it a locally generated PN sequence slightly offset in time from PN sequences applied to other fingers of the rake. The correlation values from the rake fingers are added to provide an improved input signal wherein multipath effects have been reduced.

In order to track the phase of a received PN sequence, the prior art has employed a control loop which uses the symmetry of the signal impulse response. The control loop performs an early correlation with the received signal and a late correlation with a delayed version of the received signal. The first correlation result is subtracted from the second correlation result, giving an error which is filtered and compared to thresholds.

Because the thresholds are absolute, the error signal level is affected by the level of the received signal. For low level signals, detection may, at times, be impossible. To assure best possible sampling once synchronization has been accomplished, it is vital that the applied PN sequence be precisely phase-adjusted to the received PN sequence to assure optimum signal detection. Because the receiver and transmitter clocks tend to drift with respect to each other, the receiver is required to phase shift its PN sequence to maintain phase coincidence with a received PN sequence.

Consequently, it is an object of this invention to provide a method and apparatus to track clock drift in a receiver.

It is a further object of this invention to phase lock a sampling interval to an optimum symbol phase for detection.

It is a still further object of this invention to align an equalizer with a received signal in such a way that the time span and corresponding computational power requirements of an equalizer are minimized.

It is another object of this invention to provide a system for synchronizing both frames and symbols received in a multi-path propagation environment.

It is still another object of this invention to provide a frame synchronization system that enables a first received frame to be chosen as the one upon which to synchronize.

It is yet another object of this invention to provide a symbol and frame synchronization method for a TDMA data communications system wherein only two sample intervals per symbol are employed.

It is still another object of this invention to provide a phase tracking system for a CDMA data communications system which is impervious to amplitude variations of a received signal.

It is a still further object of this invention to provide a phase tracking method for a CDMA receiver which forces chip sampling to occur in a manner such that samples have a known power ratio.

SUMMARY OF THE INVENTION

A digital radio communication system includes a receiver for receiving a signal stream that includes data frames, each frame including a data signal sequence and a synchronizing signal sequence. The communication system synchronizes the receiver by employing the signal stream and comprises: a sampling circuit for sampling symbol levels in the synchronizing signal sequence; cross correlation circuitry for comparing values derived from the sampled symbol levels with an expected set of values and producing an error value output; and correction circuitry that is responsive to the error output and produces a sample control output to the sample circuitry to alter the times of sampling of the symbol levels so as to reduce the error output and achieve time synchronization with the received synchronizing signal sequence. A further embodiment of the invention is described in relation to a CDMA receiving system.

DETAILED DESCRIPTION OF THE INVENTION

TDMA EMBODIMENT

Figures 4, 5:
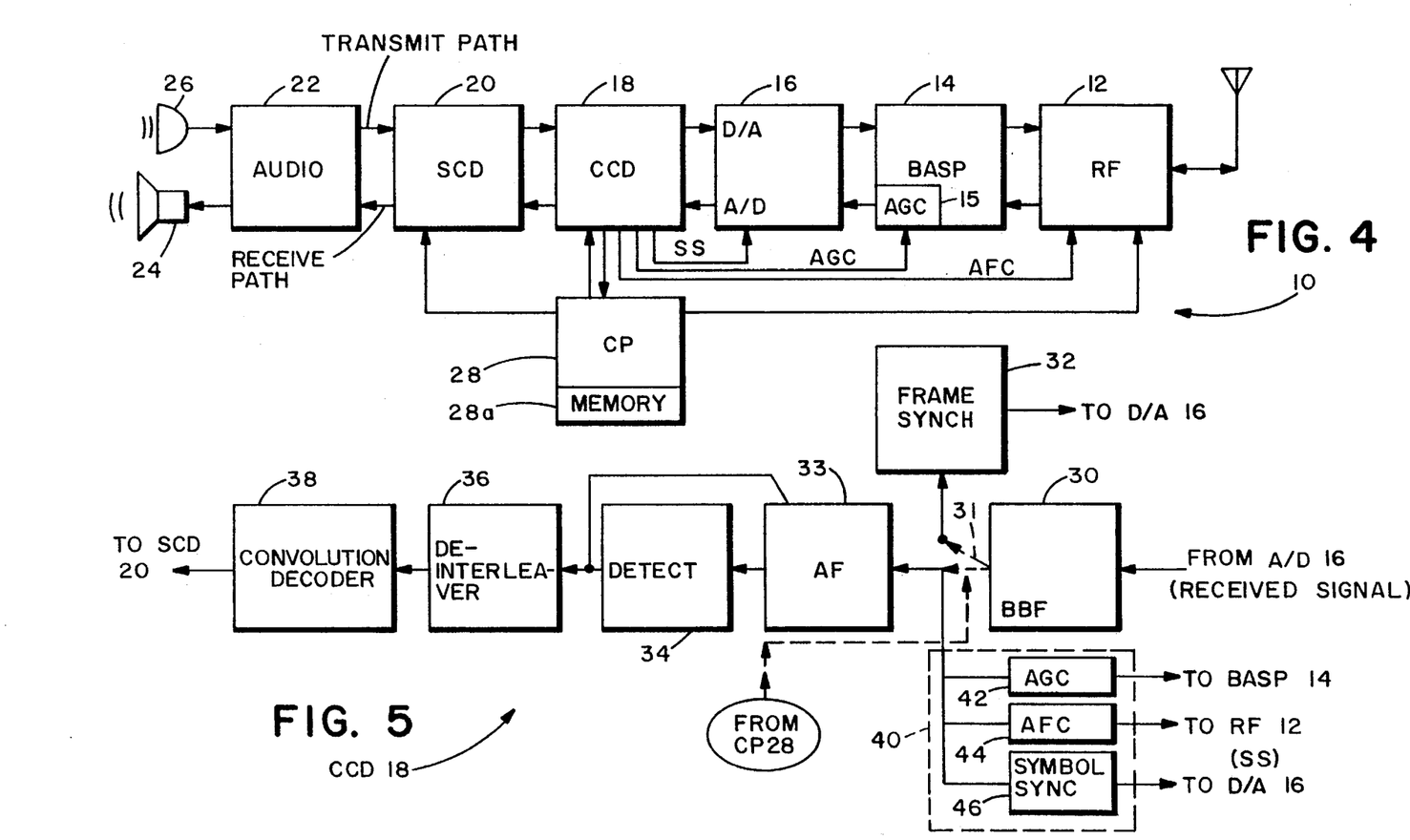
FIG. 4 is a block diagram of a digital radio telephone.
FIG. 5 is a block diagram of a decoder portion of a channel coder/decoder shown in FIG. 4.

A digital radio telephone is described that employs a frame synchronizer to lock on an incoming frame. Subsequently, the telephone achieves symbol synchronization through the use of pairs of sampled amplitude values from detected, incoming symbol waveforms. In FIG. 4, a simplified block diagram is shown of a digital radio telephone 10. In the ensuing description, reference will be made only to the reception path of the signal, although it will be realized by those skilled in the art that approximately the same signal processing occurs in the transmission path, but in a reverse order.

An antenna provides input to a radio frequency (RF) block 12 which down/converts a received RF signal from an assigned frequency, in one or more steps, to a frequency low enough (preferably baseband) to be digitally processed. RF block 12 also accomplishes necessary channel filtering.

A baseband analog signal processing block (BASP) 14 includes an automatic gain control circuit (AGC) 15 and performs baseband filtering. The output of BASP 14 is applied to an analog to digital converter (A/D) 16. A channel coder/decoder (CCD) 18 receives the digital representation of the filter's output signal and determines channel correction coefficients for an adaptive equalizer.

A speech coder/decoder (SCD) 20 converts the bits received from CCD 18 into a pulse code modulated (PCM) signal which is then expanded and converted to an analog signal by an audio block (AUDIO) 22. The output of AUDIO block 22 is the speech signal that is output by a loud speaker 24. A microphone 26 is also coupled to AUDIO block 22 and provides an analog representation of user speech. The user speech is then passed through the transmit path, in a manner opposite to that described above, to be eventually transmitted from the antenna.

A control processor (CP) 28 is employed to assign RF 12 and CCD 18 to a selected channel and to manage required protocols between mobile station 10 and a base station (not shown). It further manages a required user interface. CP 28 includes or is coupled to a memory 28a that stores instructions and data.

FIG. 5 is a block diagram that illustrates, in greater detail, components of CCD 18 in FIG. 4. An input signal from A/D 16 is low pass filtered by baseband filter (BBF) 30 and is then applied through a switch 31 (schematically shown) to either frame synchronizer block 32 or adaptive filter block (AF) 33. The output from BBF 30 is not applied to AF 33 until frame synchronization has been achieved (a preset time interval). Thus, switch 31 is, initially, in its uppermost position so as to apply the output of BBF 30 to frame synchronizer block 32. The position of switch 31 is controlled by an output from control processor 28 (see FIG. 4) and is caused to connect BBF block 30 to adaptive filter block 33 after a preset interval, during which time frame synchronization is achieved. After frame synchronization, A/D block 16 converts only data within the frame.

AF 33 provides its output to a detector (DETECT) 34 wherein a most likely symbol from a signal constellation and the symbol's corresponding bit(s) are detected. As employed herein, a symbol is considered to be a signal amplitude and phase that is selected from a modulation signal constellation.

The detected symbol, together with an unequalized signal, is employed to update the coefficients of AF 33. Detected bits are deinterleaved (block 36) and convolutionally decoded (38) before being passed to SCD 20 in FIG. 4. The operation of blocks 36 and 38 are conventional and will not be described in further detail.

Figure 6A:
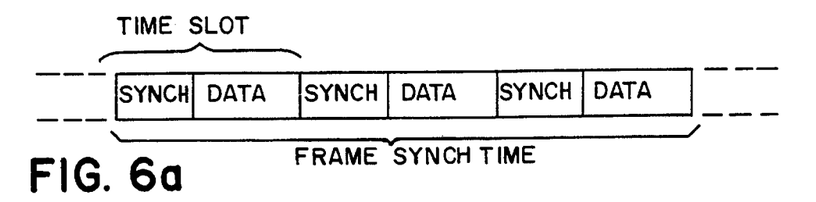
FIGS. 6a and 6b illustrate time slot arrangements and show the relationship of synchronizing sequences and data sequences.
Figure 6B:
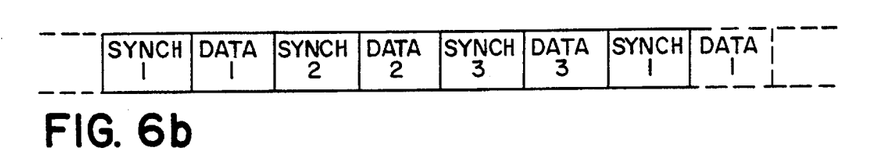

A support block 40 includes an automatic gain control (AGC) block 42, an automatic frequency control (AFC) block 44 and a symbol synchronization block 46. In FIG. 6a, frame and time slot arrangements are illustrated that occur in a digital, TDMA system. Each time slot includes a field for a synchronizing signal sequence and a field for a data sequence. Each radio telephone is assigned a specific synchronizing signal sequence and recognizes that sequence upon seeing its appearance in a time slot. A plurality of time slots (e.g., 3) comprise a frame and, as shown in FIG. 6(b), time slots directed to different radio telephones may occupy adjoining positions in a frame.

Figure 7:
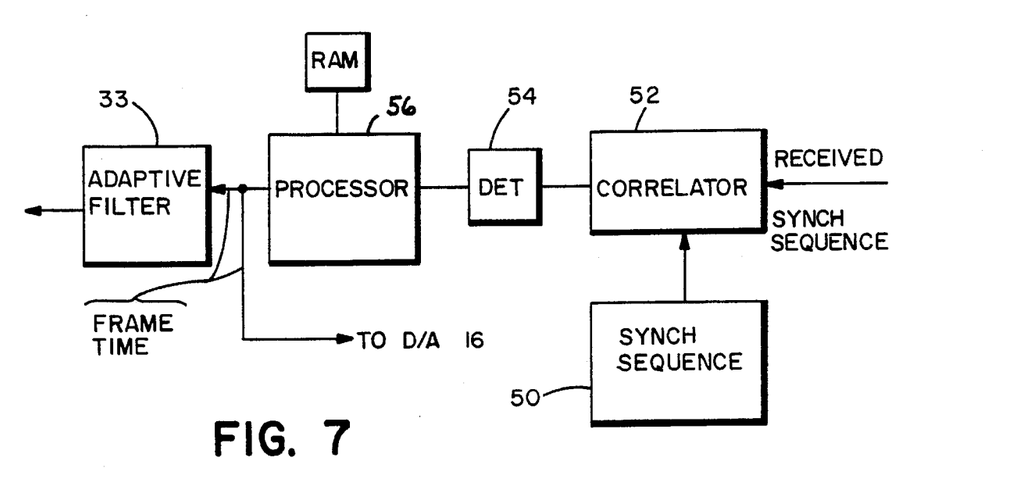
FIG. 7 is a block diagram of circuitry within frame synchronization block 32 in FIG. 5.

In order to enable decoding of data contained within the data field, both frame synchronization and symbol synchronization must be achieved. Referring to FIG. 7, the details of frame synchronizer block 32 will be described. As above indicated, each radio telephone is assigned a unique synchronizing sequence (block 50) which is applied as an input to a correlation circuit 52. Correlation circuit 52 provides a pulse output when a correlation is found between a received synchronizing sequence and the stored synchronizing sequence (block 50). That output is detected by detector 54 and applied as an input to processor 56. Processor 56 ignores all but the first detected pulse output from detector 54 so as to avoid locking onto a frame that has traveled by a less direct path and thus arrived as a delayed signal. Processor 56 determines from the output of detector 54 an approximate frame time and applies that output to adaptive filter 33 and digital/analog converter block 16. As a result, D/A block 16 is enabled to locate the synchronizing sequence field and enables the commencement of symbol synchronization. Once frame synchronization is achieved, switch 31 (FIG. 5) is moved to connect the output from BBF block 30 to signal synchronization block 46.

Figure 8:
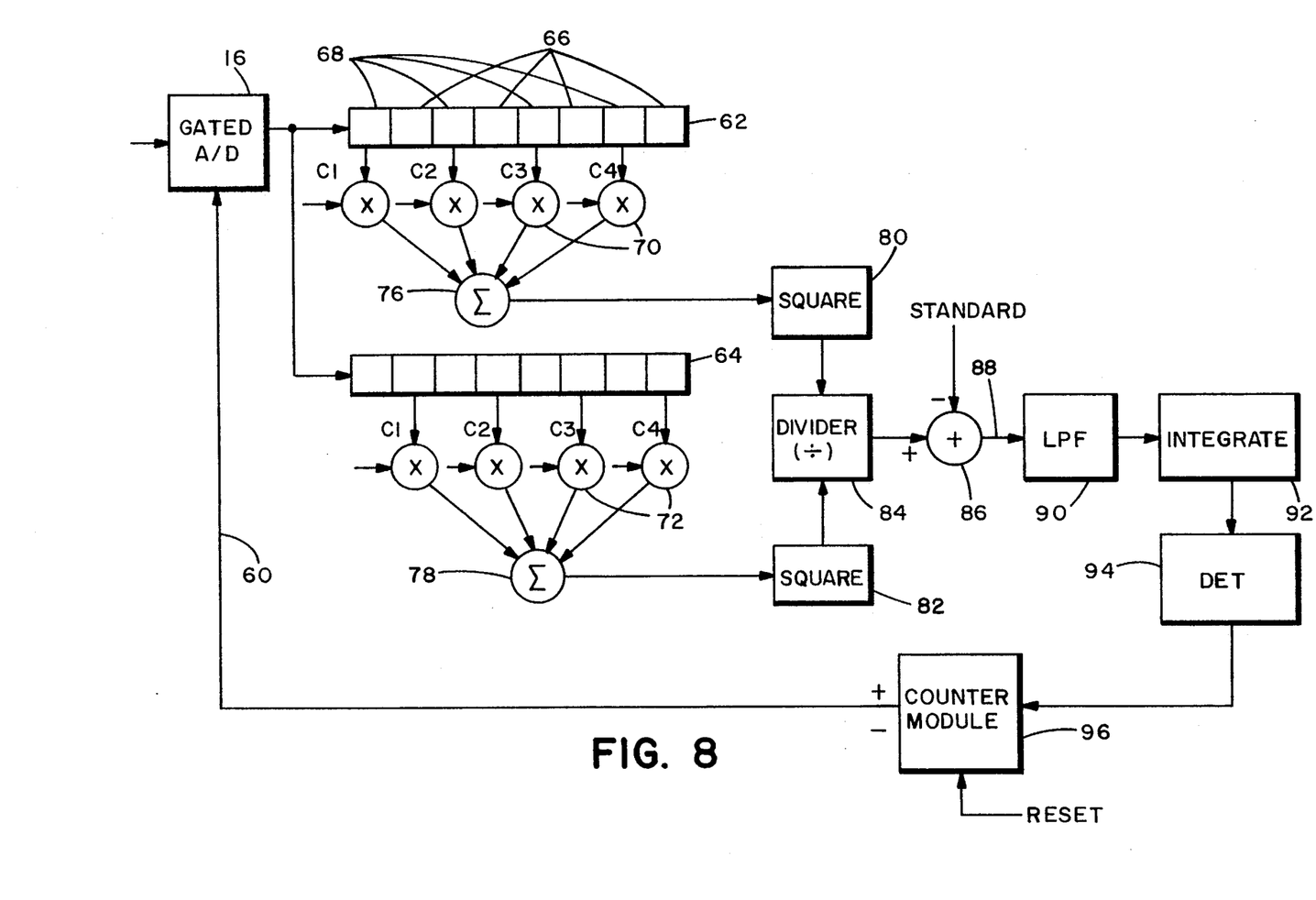
FIG. 8 is a block diagram of symbol synchronization block 46 in FIG. 5.

Referring to FIG. 8, details of symbol synchronization block 46 will be hereafter described. Symbol synchronization block 46 achieves a cross correlation between a received synchronizing signal sequence and the synchronization sequence stored within the radio telephone. The cross correlation is calculated at two time instances separated by a half signalling period. If there is no intersymbol interference present and the synchronization sequence exhibits a partial autocorrelation property, the cross correlation provides two amplitude samples of a signal pulse, the samples having a known relationship, one to the other (e.g. as illustrated in FIG. 3). The two timing instances at which the cross correlation is calculated are ideally such that one cross correlation is calculated at the peak of a symbol pulse and the other one is calculated half a symbol earlier. When the latter value is divided by the first value and compared to a fixed value calculated for an ideal pulse, the result is an error signal. For example, if the signal impulse is a 35% raised cosine pulse (the peak value of which is normalized to 1), the value half a symbol earlier than its peak is approximately equal to 0.7. To remove the complex phase of the signal, the signal is squared thus giving an approximate value of 0.4. When the latter value is divided by the former value, the result is equal to 0.4. This is the ideal value to be achieved by a received symbol that is in synchronization.

Figure 9:
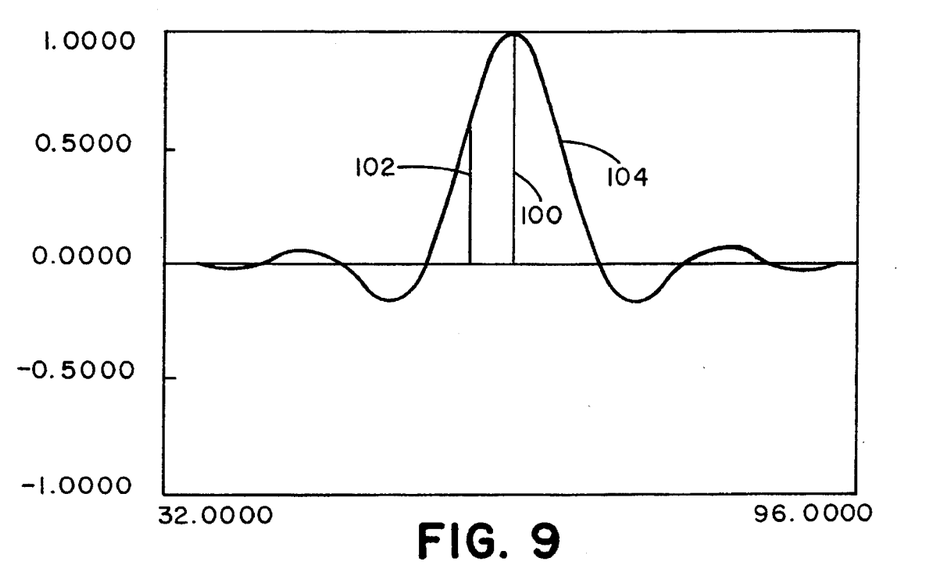
FIG. 9 shows a symbol waveform being amplitude sampled at optimal times.
Figure 10:
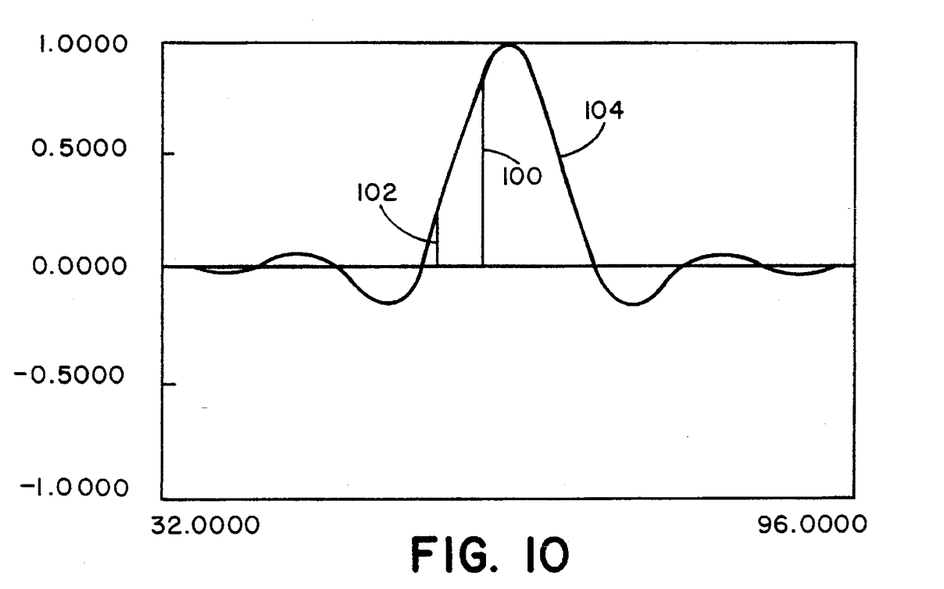
FIG. 10 shows a symbol waveform that has advanced in phase with respect to the amplitude sample times.
Figure 11:
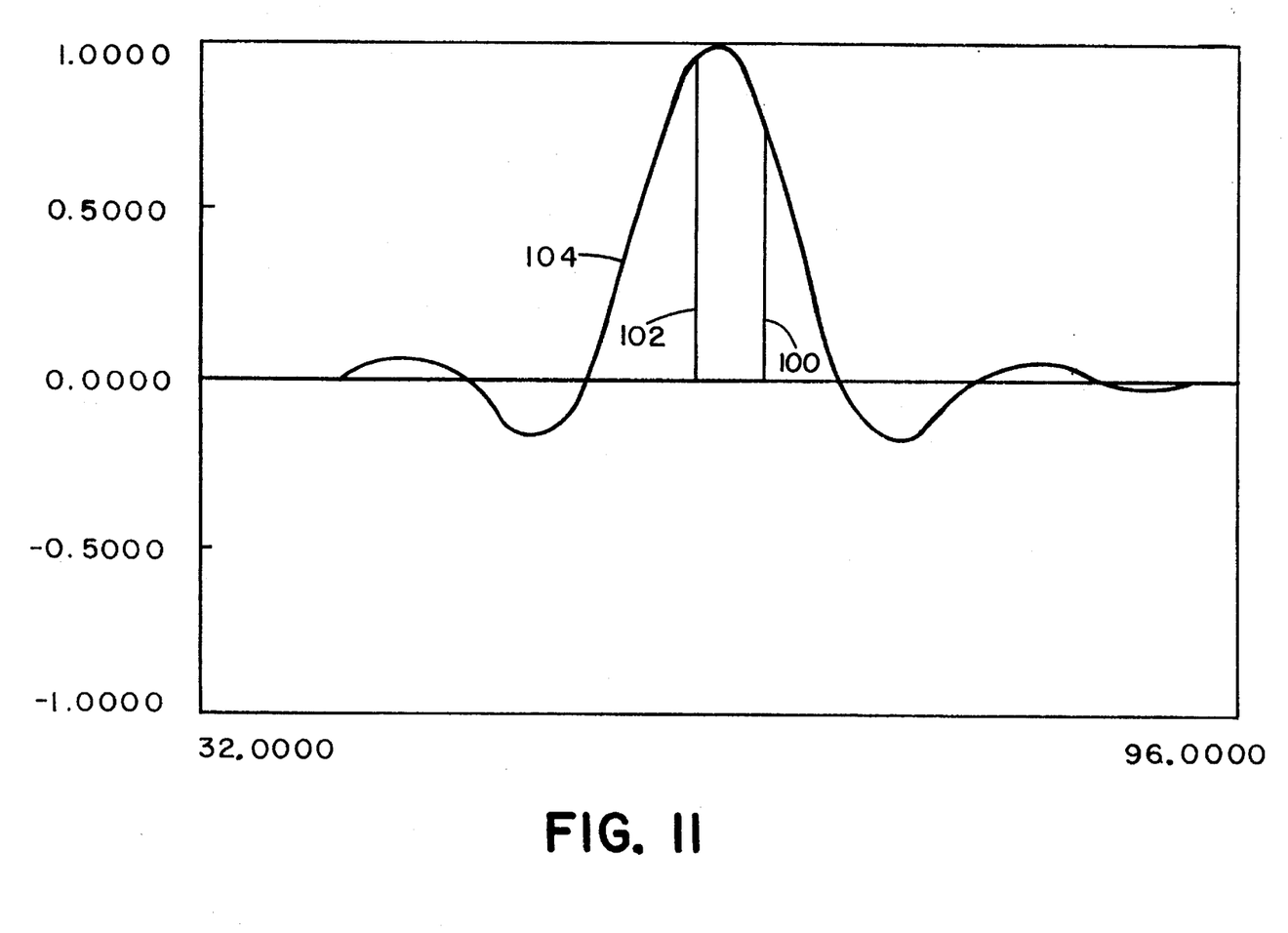
FIG. 11 shows a symbol waveform that has been retarded in phase with respect to the amplitude sampling times.

The circuit of FIG. 8 determines whether such a ratio exists, and if not, adjusts the sampling time in such a manner so as to bring such a ratio into being. Symbol synchronization block 46 provides a pair of gating pulses via line 60 to gated A/D converter 16. In FIG. 9, set of sampling pulses 100 and 102 is illustrated with respect to symbol signal 104. If a proper synchronization relationship exists between symbol signal 104 and sample pulses 100 and 102, sample pulse 100 samples the peak of signal 104 and sample pulse 102 samples a level of signal 104 that is exactly a half symbol time prior to its peak time. By contrast (as shown in FIG. 10) if symbol signal 104 is advanced in time with respect to sample pulses 100 and 102, a proper relationship between the sample values will not exist. In a similar manner, if as shown in FIG. 11, symbol signal 104 has been delayed so that sampling pulses 100 and 102 are advanced in time from that desired, again the results of amplitude values sampled at the times pulses 100 and 102 are generated, will not exhibit the proper relationship.

In FIG. 8, the output from gated A/D block 16 is applied, in parallel, to a pair of registers 62 and 64. Each register holds four pairs of complex amplitude sample values from gated A/D block 16. The initial amplitude sample value for each symbol (pulse 100) is stored in stages 66 whereas the second amplitude sample value is stored in register stages 68. Thus, a pair of adjacent register stages 66 and 68 will contain a pair of sampled symbol amplitude values from a received symbol signal. An output from each of stages 68 in register 62 is fed to a multiplier 70, to which one of a plurality of coefficients C1–C4 is applied. Those coefficients are determined from the expected symbol values of the synchronizing signal sequence assigned to radio telephone 10. Similarly, an output from each of stages 66 in register 64 is applied to a multiplier 72. Also applied to each multiplier 72 is a set of coefficients C1–C4. Thus it can be seen, that the outputs from multipliers 70 and 72 represent a correlation of the sampled amplitude values and coefficients C1–C4, respectively.

The outputs from each of multipliers 70 are applied to a summing circuit 76 and the outputs from each of multipliers 72 are applied to a summing circuit 78. Outputs from summing circuits 76 and 78 are applied through squaring circuits 80 and 82 to a divider circuit 84. As indicated above, if the sampled synchronizing sequence is in synchronism with the receiver circuits (i.e., symbol signals 104 are properly synchronized with sample pulses 100 and 102), outputs from summers 76 and 78, after squaring, will provide an output approximately equal to 0.4 from divider 84. If, however, received symbol signals are not in synchronism with sample pulses 100 and 102, the output from divider 84 will be another value.

The output from divider 84 is applied as an input to a difference circuit 86, the other input to which is the standard expected output value, the value produced if signal synchronization is proper. Thus, a signal appearing on line 88 from difference circuit 86 will be an error value that is equal to the difference between the output from divider circuit 84 and the expected value input to difference circuit 86.

The error signal on line 88 is fed through a low pass filter 90, an integrator 92 and detector 94 to a counter block 96. Because of the phenomenon of fast fading and multipath propagation, the arrival time of synchronization sequences varies substantially. Consequently, the error signal appearing on line 88 is filtered before it is used. Filter 90, integrator 92 and detector 94 accomplish such filtering.

Sample pulses 100 and 102 are generated by counter block 96. Counter block 96 always issues a pulse pair 100 and 102 with a set time therebetween, however, the absolute time of occurrence between succeeding pulse pairs is controllable by a count achieved within counter block 96.

For instance, only when the aforementioned output from divider circuit 84 is equal to a preset value (e.g. 0.4) does the output of comparator circuit 86 achieve a null. Under those conditions, the count within counter block 96 is constant between succeeding pulse pairs 100 and 102. Such a situation arises when the relationship between signal symbol 104 and pulses 100 and 102 is as shown in FIG. 9.

By contrast, if symbol signal 104 has advanced in phase with respect to pulses 100 and 102, then a positive level appears on output line 88 from comparator circuit 86. That positive level, after filtering, integration and detection causes counter 96 to increase its count by one pulse. As a result, the time between succeeding pulse pairs 100 and 102 is increased by one count, as shown in FIG. 10.

If the relationship between symbol signal 104 and pulses 100, 102 is as shown in FIG. 11, then a negative level issues from comparator circuit 86 which causes the count issued from counter 96 to decrement by one count. Over the course of a plurality of samples, pulses 100, 102 are thus brought into synchrony with symbol signal 104. As can thus be seen, the circuit of FIG. 8 continually provides phase correction for the interval between succeeding pulse pairs 100, 102 so as to maintain their time position in proper relationship to a received symbol signal.

CDMA EMBODIMENT

Figure 12:
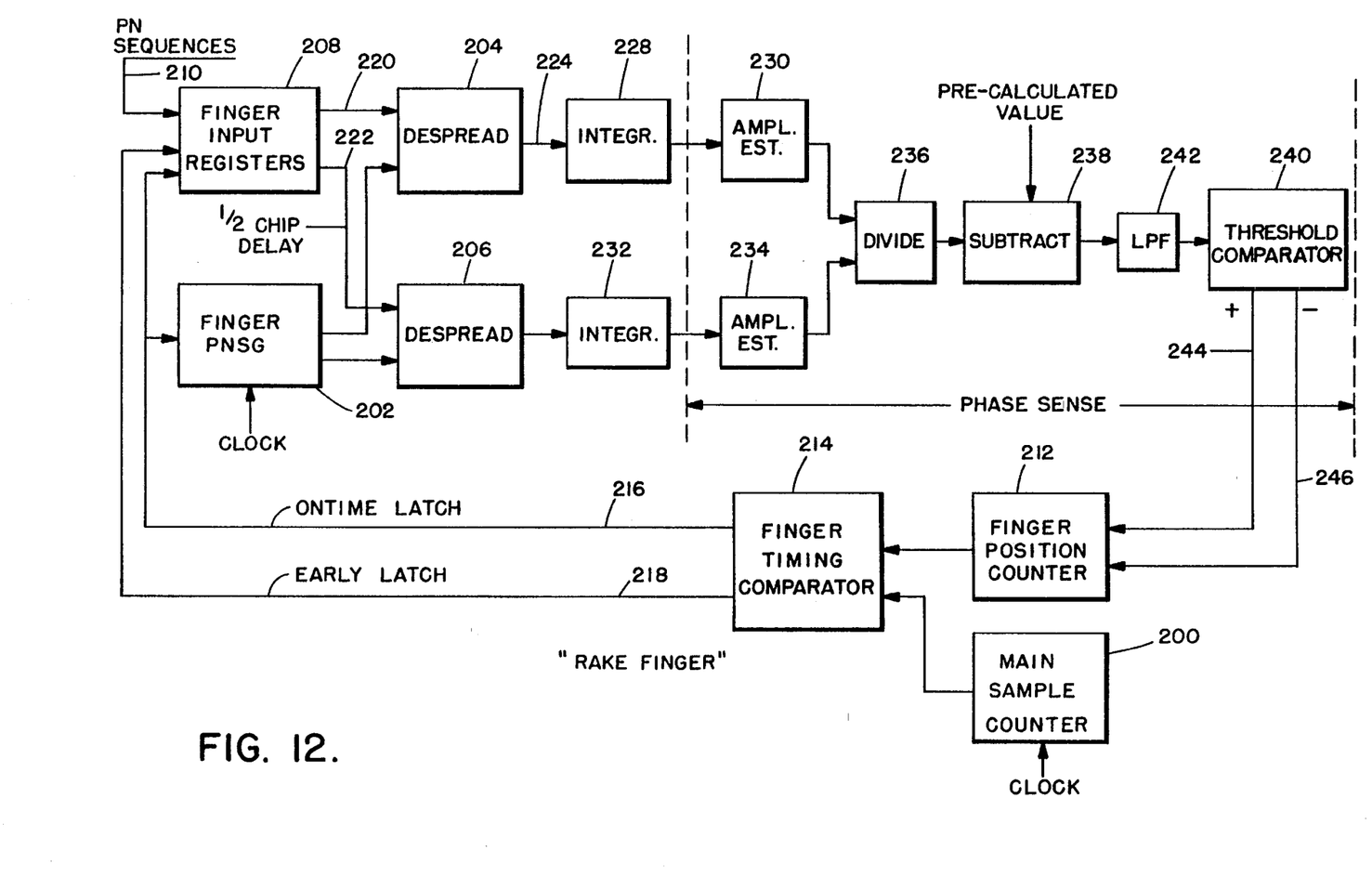
FIG. 12 is a block diagram of phase synchronizing circuitry employed in a CDMA version of the invention.

Referring to FIG. 12, application of the invention to a CDMA mobile receiver will be described. The objective of the circuit of FIG. 12 is to alter the timing of a locally generated PN sequence with respect to a received PN sequence so that the locally generated PN sequence is temporally aligned to assure a best correlation (despreading) action. The mobile receiver incorporates a rake receiver that includes a main sample counter 200 which is, in turn, synchronized with the receiver's clock. Main sample counter 200 provides its output to each of a plurality of rake finger signal channels (only one such finger channel is shown in FIG. 12).

As the receiver's clock input to main sample counter 200 will drift in relation to an incoming signal, so also will all signals that are linked to the drifting clock alter their time position. The circuit of FIG. 12 assures, irrespective of clock drift, that the generation of the local finger PN sequence will be altered to track the phase of the incoming signal—rather than remaining strictly synchronized to the local clock.

The rake finger channel of FIG. 12 includes a local finger PN sequence generator (PNSG) 202 which provides its output to despreader circuits 204 and 206. Finger input registers 208 are provided to latch incoming chips from a received PN sequence over line 210. It is to be remembered that preceding the rake finger signal channel shown in FIG. 12 is the receiver's synchronizing section which assures a coarse synchronization of the circuit's timing with the received PN sequence. The circuit of FIG. 12 provides fine phase adjustments and assures optimal signal detection.

A main sample counter 200 is provided with as many bits as required to count samples over one PN sequence. For instance, if a PN sequence is 32,768 chips long and an oversampling ratio of 8 samples per chip is employed, then main sample counter 200 comprises 18 bit positions. The main sample counter 200 is synchronized with the PN sequence so that its count is zero during a first sampling clock period of the first PN sequence chip. As will be hereafter understood, each chip is preferably sampled at 2 points in time, one that is one-half of a chip before the expected chip maximum impulse response (i.e. the "early" sample) and one when the impulse response for the chip is at its maximum level (i.e. the "on-time" sample).

The circuit of FIG. 12 assures, that if the early and on-time samples exhibit a proper amplitude ratio, indicating that the sample times are in proper phase relationship with a received chip, then no alteration of the phase of the locally generated PN sequence is required. By contrast, if the amplitude ratio of the sampled values varies either in a positive or negative direction, the phase of the rake receiver's locally generated PN sequence (and the time that a received PN sequence is latched) are changed to return the amplitude sample ratio to a desired norm. The adjustment of the aforesaid latch and PN sequence enable signals are derived as a result of variations in outputs from a finger position counter 212. The three least significant bits (LSB) of position counter 212 are compared with the three LSBs from main sample counter 200 in finger timing comparator 214 which outputs an on-time latch signal on line 216 and an early latch signal on-line 218.

PN sequence signals received via line 210 include both I and Q phase values, which values are latched into finger input registers 208, etc. However, only the I (real) signal chain will be hereafter described, it being understood that both I and Q signal streams are present.

The output from finger PNSG 202 is fed to despreaders 204 and 206. In a similar fashion, chip sample outputs from finger input registers 208 are fed via lines 220 and 222 to despreaders 204 and 206. The chip sample value appearing on line 222 exhibits a ½ chip period delay from the chip sample value on line 220.

Figure 13:
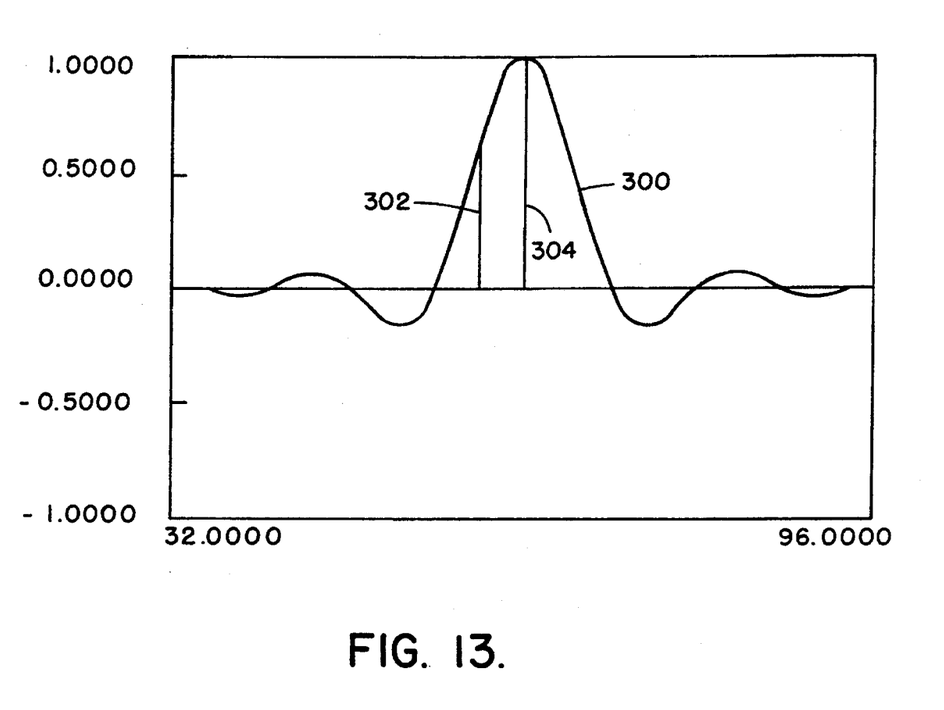
FIG. 13 shows a chip impulse response and optimum sample times therefor.

Each of despreaders 204 and 206 crosscorrelates the outputs from finger PNSG 202 and the outputs from finger input registers 208 to derive both early and on-time samples on output lines 224 and 226, respectively. The early and on-time outputs appearing on lines 224 and 226 are fed to integration and amplitude estimation blocks 228, 230 and 232, 234 respectively. Referring briefly to FIG. 13, waveform 300 is indicative of a chip impulse; amplitude values 302 and 304 are, respectively, the early and on-time sample values that form a desired output from despreaders 204 and 206.

The resulting estimated amplitudes are divided in divider 236 to provide a ratio value between the early and on-time cross-correlation values. Next, a precalculated value is subtracted in subtractor 238 from the ratio value. The precalculated value is set at a value so as to render the subtracted value equal to a predetermined level, for later comparison in a threshold comparator 240. A low pass filter 242 smooths the output values from subtractor 238. Threshold comparator 240 applies a logical high level to line 244 if the difference exceeds a predetermined threshold. That logical high level causes finger position counter 212 to count up one count. If the difference applied to threshold comparator 240 is less than a second threshold, a logical high level is applied to line 246, which causes finger position counter to count down one count.

Referring to FIG. 13, if sample values 302 and 304 are taken at an earlier time, it can be seen that the ratio therebetween increases. Similarly, if time sample values 203 and 204 are taken at a later time, the ratio therebetween decreases. In either case, the sample times are moved in tandem to return the sample values to the points shown in FIG. 13. This action is accomplished by the output from finger position counter 212 being applied to finger timing comparator 214. In the comparator, the three LSB's of the finger position counter 212 are compared to the three LSB's of the main sample counter. However, main sample counter 200 is being continuously incremented and hence the bits will match once every eight count. At that time, finger timing comparator 214 will issue a latch signal onto line 218 and, ½ chip later, a further latch signal onto line 216.

If the output from finger position counter 212 counts up one count, the LSB's will match one count later with respect to the main sample counter. As a result, the time at which finger input registers latch their respective chip values and finger PNSG 202 outputs its chip value are both changed in tandem, causing the control path to begin moving the time that sample values 302 and 304 are taken to a changed time instant. The procedure repeats any time the output of finger position counter 212 varies its count.

Accordingly, the rake finger signal channel is enabled to maintain its phase relationship with an incoming PN sequence, even though the receiver's clock signal drifts in relation to the clock signal at a transmitter. For expected values of clock drift (assuming a pre-synchronization has occurred), the circuit of FIG. 12 is able to maintain precise phase synchronization between the locally generated PN sequence and an incoming PN sequence so as to enable optimum despreading action and data recovery.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for phase synchronizing a receiver in a radio communication system which operates in a code-division multiple access (CDMA) environment and receives a signal stream including a spread spectrum signal having data encoded with pseudo-random noise (PN) sequences of chips, said method comprising the steps of:

generating a local PN sequence of chips at said receiver;

sampling a received spread spectrum signal at first and second sample times during each of a plurality of chips in a received PN sequence, said first and second sample times separated by a partial chip interval;

despreading samples made at said first and second sample times under control of said local PN sequence of chips;

deriving despreading values from the result of said despreading of samples made at said first and second sample times under control of said local PN sequence of chips;

calculating a ratio between said first and second despreading values;

deriving an error signal based upon a difference between said ratio and a predetermined desired value; and employing said error signal to adjust a time of occurrence of said first and second sample times so as to reduce said error signal.

2. The method as recited in claim 1, wherein said partial chip interval is approximately ½ chip in duration.

3. The method as recited in claim 2, wherein said employing step adjusts said second sample time to occur at a peak of an impulse response created by a chip.

4. A system for phase synchronizing a receiver in a radio communication system which operates in a code-division multiple access (CDMA) environment and receives a signal stream including a spread spectrum stream having a spread spectrum signal comprising data encoded with pseudo-random noise (PN) sequences of chips, said system comprising:

means for generating a local PN sequence of chips at said receiver;

means for sampling a received spread spectrum signal at first and second sample times during each of a plurality of chips in a received PN sequence, said first and second sample times separated by a partial chip interval;

means for despreading samples made at said first and second sample times under control of said local PN sequence of chips;

means for deriving despreading values from the result of said despreading of samples made at said first and second sample times under control of said local PN sequence of chips;

means for calculating a ratio between said first and second despreading values;

means for deriving an error signal based upon a difference between said ratio and a predetermined desired value; and means for employing said error signal to adjust a time of occurrence of said first and second sample times so as to reduce said error signal.

5. The system as recited in claim 4 wherein said means for sampling level samples each of said plurality of chips at the first and second sample times, and wherein said level samples sampled at said first sample time exhibit an amplitude value different from said level samples sampled at said second sample time if said means for sampling is operating in phase with said chips.

6. The system as recited in claim 5 wherein said first and second sample times are separated by a constant time period, and said means for employing causes said first and second sample times to be moved in tandem when moved with respect to a chip signal to be sampled.

7. The system as recited in claim 4 wherein said means for employing comprises:

a position counter for providing a plus or minus count increment depending upon said error signal;

a sample counter synchronized to a clock in said receiver; and comparator means for comparing count values of said position counter and sample counter and for outputting a latch signal in accord with said comparing, said latch signal thereby outputted at an altered time and causing a time alteration in generation of said local PN sequence.

* * * * *